US008954778B2

(12) United States Patent
Robertson et al.

(10) Patent No.: US 8,954,778 B2
(45) Date of Patent: Feb. 10, 2015

(54) ELECTRONIC TIMEKEEPING CIRCUIT AND A METHOD FOR OPERATING TIMEKEEPING CIRCUIT

(75) Inventors: Peter Robertson, Sunnyvale, CA (US); Allen Mann, Menlo Park, CA (US)

(73) Assignee: NXP B.V., Eindhoven (NL)

(*) Notice: Subject to any disclaimer, the term of this patent is extended or adjusted under 35 U.S.C. 154(b) by 273 days.

(21) Appl. No.: 13/174,401

(22) Filed: Jun. 30, 2011

(65) Prior Publication Data
US 2013/0003509 A1    Jan. 3, 2013

(51) Int. Cl.
*G06F 1/12* (2006.01)
*G06F 1/30* (2006.01)
*G04G 19/12* (2006.01)

(52) U.S. Cl.
CPC . *G06F 1/30* (2013.01); *G04G 19/12* (2013.01)
USPC .......................................................... 713/400

(58) Field of Classification Search
CPC ..................................................... G01S 19/24
USPC ......................................... 713/400; 368/204
See application file for complete search history.

(56) References Cited

U.S. PATENT DOCUMENTS

| | | | |
|---|---|---|---|
| 6,069,850 A | 5/2000 | Capps, Jr. et al. | |
| 6,327,650 B1 * | 12/2001 | Bapst et al. | 712/228 |
| 6,393,571 B1 | 5/2002 | Huckfeldt et al. | |
| 6,985,811 B2 | 1/2006 | Gronemeyer | |
| 7,539,880 B2 | 5/2009 | Mentzer et al. | |
| 2002/0049893 A1 * | 4/2002 | Williams et al. | 712/11 |
| 2004/0107373 A1 * | 6/2004 | Ferrara | 713/300 |
| 2008/0104433 A1 * | 5/2008 | May et al. | 713/300 |

FOREIGN PATENT DOCUMENTS

CN        101067756 A    11/2007

OTHER PUBLICATIONS

Office Action for CN counterpart 201210216982.9 (Sep. 28, 2014).

* cited by examiner

*Primary Examiner* — Jaweed A Abbaszadeh
*Assistant Examiner* — Alyaa T Mazyad

(57) ABSTRACT

An electronic timekeeping circuit and a method for operating an electronic timekeeping circuit are described. In one embodiment, an electronic timekeeping circuit includes power supplies and timekeeping circuit components that are grouped into power supply domains. Power is supplied to each of the power supply domains by a corresponding one of the power supplies. Timekeeping registers are duplicated for each of the power supply domains. The timekeeping registers are synchronized between the power supply domains if one of the timekeeping registers is modified or if one of the power supplies is turned off and subsequently turned back on. Other embodiments are also described.

20 Claims, 3 Drawing Sheets

ELECTRONIC TIMEKEEPING CIRCUIT AND A METHOD FOR OPERATING TIMEKEEPING CIRCUIT

In conventional electronic timekeeping circuits, timekeeping registers usually are not duplicated. For example, parameters stored in timekeeping registers that serve basic timekeeping functional units of a conventional electronic timekeeping circuit are not synchronized to registers located at other sections of the circuit. As a result, when an external entity, such as a microprocessor, needs to use the parameters stored in the timekeeping registers, the external entity has to access these timekeeping registers. In a microprocessor environment, register access may occur quite frequently.

However, power consumption and accessibility issues arise when timekeeping registers are frequently accessed. For example, because power needs to be constantly drawn from a corresponding power supply of the timekeeping registers, the corresponding power supply can be depleted within a short time. In addition, frequent accesses of the timekeeping registers can cause congestion of peripheral buses and/or bus interfaces.

An electronic timekeeping circuit and a method for operating an electronic timekeeping circuit are described. In one embodiment, an electronic timekeeping circuit includes power supplies and timekeeping circuit components that are grouped into power supply domains. Power is supplied to each of the power supply domains by a corresponding one of the power supplies. Timekeeping registers are duplicated for each of the power supply domains. The timekeeping registers are synchronized between the power supply domains if one of the timekeeping registers is modified or if one of the power supplies is turned off and subsequently turned back on. Other embodiments are also described.

In an embodiment, an electronic timekeeping circuit includes a first power supply, a second power supply, and timekeeping circuit components that are grouped into a first power supply domain and a second power supply domain. Power is supplied to the first power supply domain exclusively by the first power supply. Power is supplied to the second power supply domain exclusively by the second power supply. Timekeeping registers are duplicated for each of the first and second power supply domains. The timekeeping registers are synchronized between the first and second power supply domains if one of the timekeeping registers is modified or if one of the first and second power supplies is turned off and subsequently turned back on.

In an embodiment, a method for operating an electronic timekeeping circuit comprising power supplies and timekeeping circuit components includes providing power supply domains, where the timekeeping circuit components are grouped into the power supply domains, and where power is supplied to each of the power supply domains by a corresponding one of the power supplies; duplicating timekeeping registers for each of the power supply domains; monitoring the timekeeping registers and the power supplies of the electronic timekeeping circuit; and synchronizing the timekeeping registers between the power supply domains if one of the timekeeping registers is modified or if one of the power supplies is turned off and subsequently turned back on.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
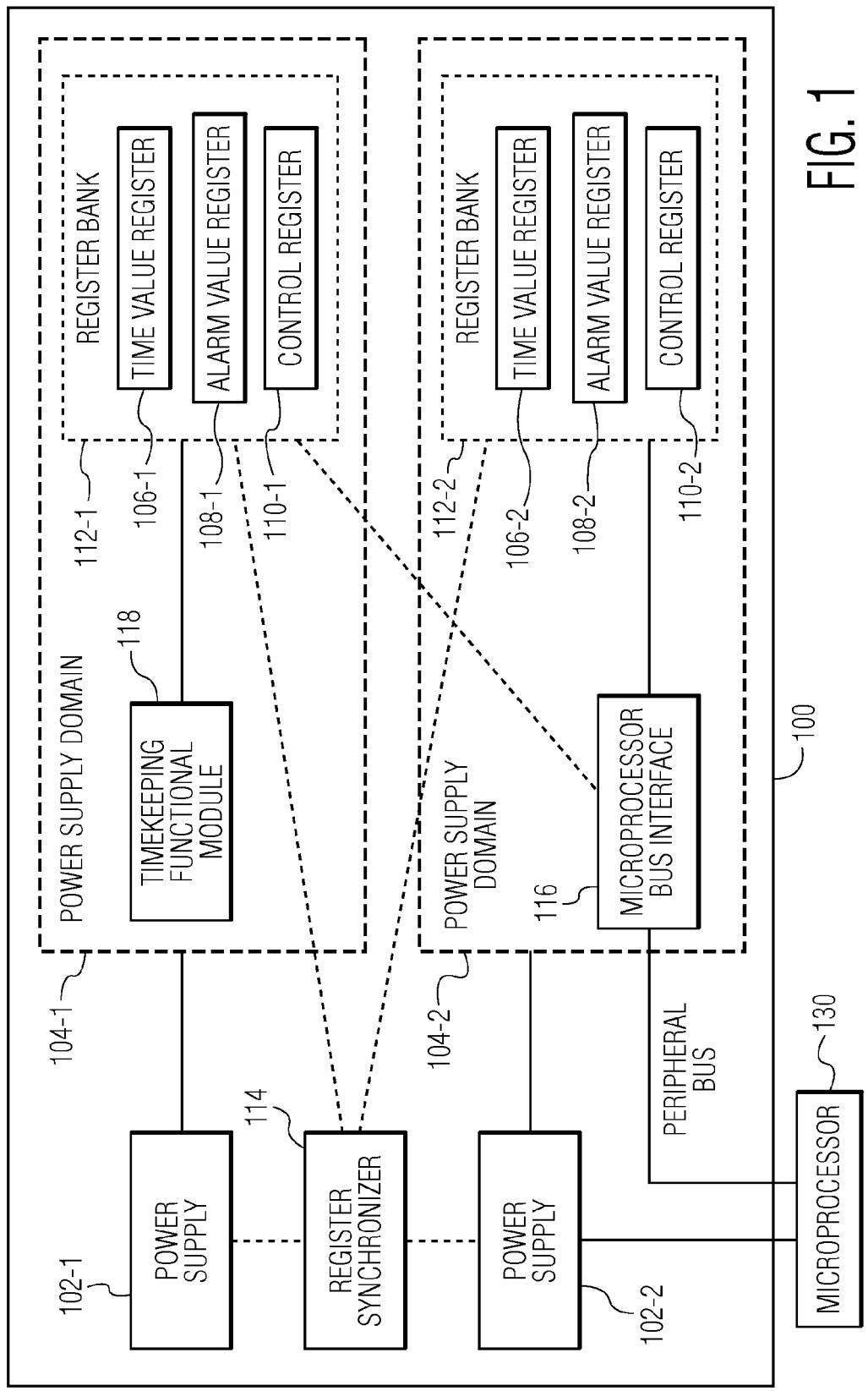
FIG. 1 is a schematic block diagram of an electronic timekeeping circuit in accordance with an embodiment of the invention.

FIG. 1 is a schematic block diagram of an electronic timekeeping circuit 100 in accordance with an embodiment of the invention. The electronic timekeeping circuit 100 may be used for various devices and applications, such as computers, industrial machineries, and appliances. In the embodiment depicted in FIG. 1, the electronic timekeeping circuit 100 includes power supplies 102-1, 102-2, and timekeeping circuit components that are grouped into or assigned to power supply domains 104-1, 104-2. The electronic timekeeping circuit 100 is connected to a microprocessor 130. Although the electronic timekeeping circuit 100 is depicted and described with certain components and functionality, other embodiments of the electronic timekeeping circuit 100 may include fewer or more components to implement less or more functionality. For example, the electronic timekeeping circuit 100 may include more than two power supplies and/or more than two power supply domains.

The power supplies 102-1, 102-2 of the electronic timekeeping circuit 100 may include any type of power supplies. In an embodiment, the power supplies 102-1, 102-2 include at least one battery power supply. For example, the power supplies 102-1, 102-2 may include a lithium battery and/or any other type of battery. The power supplies 102-1, 102-2 provide power for timekeeping circuit components of the electronic timekeeping circuit 100.

Each of the power supply domains 104-1, 104-2 is supplied by a corresponding one of the power supplies 102-1, 102-2. In an embodiment, power is exclusively supplied to at least one of the power supply domains by one of the power supplies 102-1, 102-2. In the embodiment depicted in FIG. 1, power is exclusively supplied to the power supply domain 104-1 by the power supply 102-1 while power is exclusively supplied to the power supply domain 104-2 by the power supply 102-2. In another embodiment, power is supplied to at least one of the power supply domains by multiple power supplies. For example, power may be supplied to one of the power supply domains 104-1, 104-2 by both of the power supplies 102-1, 102-2. Although the number of power supplies is the same as the number of power supply domains in the embodiment depicted in FIG. 1, the number of power supplies may be different from the number of power supply domains in other embodiments.

Timekeeping circuit components of the electronic timekeeping circuit 100 perform timekeeping functions, such as generating a current time value, storing the current time value and other parameters, and communicating with external entities. Examples of the timekeeping circuit components include, without limitation, current time value generators (e.g. oscillators), storage units (e.g. timekeeping registers), and communications interfaces (e.g. microprocessor bus interfaces). For example, the electronic timekeeping circuit 100 may include timekeeping registers to store timekeeping values. In an embodiment, the timekeeping registers are duplicated for each of the power supply domains 104-1, 104-2. For example, timekeeping circuit components that are grouped into each of the power supply domains include the same set of timekeeping registers. In the embodiment depicted in FIG. 1, the power supply domain 104-1 contains a time value register 106-1, an alarm value register 108-1, and a control register 110-1 and the power supply domain 104-2 contains a time value register 106-2, an alarm value register 108-2, and a control register 110-2. Each time value register is configured to store a current time value that is generated by the electronic timekeeping circuit 100. In an embodiment, each time value register contains a number, which is usually the number of seconds since one of the power supplies 102-1, 102-2 is installed. For example, if a time value register has 32 bits, the time value register will be able to store a maximum value of $2^{32}$ seconds, which is approximately the number of seconds in 136 years. Each alarm value register is configured to store an alarm value of the electronic timekeeping circuit 100. In an embodiment, each alarm value register stores a fixed number that usually does not change with the value stored in a corresponding time value register. The number stored in an alarm value register is usually larger than the value stored at a corresponding time value register. For example, a time value register contains a number 1000, which represents that 1000 seconds have elapsed since reset or 1000 seconds have elapsed since one of the power supplies 102-1, 102-2 is installed. In this example, a corresponding alarm register is set to 2000, which means that an alarm will go off 1000 seconds in the future, at the time when the time value register has been incremented to 2000. Software codes that the microprocessor 130 executes can convert the number of seconds to an actual date and time. Each control register is configured to store one or more control parameters. The control parameters can be used to enable and disable a timekeeping function of the electronic timekeeping circuit 100 such that the updating of the time value registers can be started or stopped, an alarm function of the electronic timekeeping circuit 100, and/or an external interrupt. In an embodiment, the registers of the electronic timekeeping circuit 100 are implemented as volatile memory. In this embodiment, the values stored in the time value registers, the alarm value registers, and the control registers are lost if power supplied to the registers is turned off. In the embodiment depicted in FIG. 1, each set of time value register, alarm value register, and control register is organized into a register bank 112-1, 112-2. A register bank is a logical association in which timekeeping registers in the same register bank are associated with the same power supply domain. A register bank may be located in a single device or distributed across multiple devices.

In an embodiment, the timekeeping registers 106-1, 106-2, 108-1, 108-2, 110-1, 110-2 are synchronized if one of the timekeeping registers is modified or if one of the power supplies 102-1, 102-2 is turned off and subsequently turned back on. For example, the electronic timekeeping circuit 100 may include a register synchronizer 114 configured to monitor states of the timekeeping registers and/or the power supplies 102-1, 102-2 and to synchronize the timekeeping registers based on the monitored states. The register synchronizer 114 may include one or more level shifters. In an embodiment, logical signals are used to indicate whether or not power supply voltages of the power supplies are valid. A power supply voltage of a power supply is valid if the power supply is turned on and/or a voltage of the power supply is higher than a voltage threshold. In this embodiment, the timekeeping registers are synchronized, for example, by the register synchronizer, if one of the power supply voltages becomes invalid as indicated by the logical signals. For example, the register synchronizer monitors the power supplies 102-1, 102-2 and synchronizes the timekeeping registers if one of the power supplies 102-1, 102-2 is turned off. Although the register synchronizer is shown in FIG. 1 as not being an element of the power supply domains 104-1, 104-2, in other embodiments, the register synchronizer may be an element of one of the power supply domains 104-1, 104-2 and power may be supplied to the register synchronizer by a corresponding power supply 102-1 or 102-2.

In an embodiment, for at least one of the power domains 104-1, 104-2, the electronic timekeeping circuit 100, such as register synchronizer 114, includes a power-on detector (not shown), which sends out a signal such as a short signal pulse when a corresponding power supply 102-1 or 102-2 is turned on. The power detector may be a dedicated circuit that is separate from registers and logic control circuits of the electronic timekeeping circuit 100. The electronic timekeeping circuit 100 may include two power-on detectors, which include one power-on detector for each of the power supplies 102-1, 102-2. The power-on signal is used to synchronize the registers 106-1, 106-2, 108-1, 108-2, 110-1, 110-2. The power-on detector for the power supply 102-2 may generate a "power ok" signal, which stays on when the power is adequate for running the microprocessor 130. The power-on detector for the power supply 102-1 may generate a "power ok" signal, such as a "battery ok" signal if the power supply 102-1 is a battery. If the microprocessor reads the battery ok signal and finds that the battery ok signal is in the not-ok state, the battery 102-1 needs to be replaced. The power supply 102-2 for the microprocessor can be switched on and off with status signals that indicate that the microprocessor can run OK (e.g. full power available for the power supply 102-2) or the microprocessor needs to stop (e.g. the power supply 102-2 about fully depleted). In an embodiment, synchronization of the registers is performed whenever the power-on signals are detected, no matter whether or not the synchronization is actually being needed. It usually takes some period of time, such as 100 microseconds, for a power supply voltage to go from 0V to a final operational voltage value. During the start-up period, the voltage of the power supply voltage will be at an intermediate voltage level that is less than the full operational voltage value. In an embodiment, this intermediate voltage can be detected and used to synchronize the registers before the voltage of the power supply voltage reaches a level that is high enough to run a corresponding device such as the microprocessor. For example, register values from registers in the power domain 104-1 are copied into the corresponding registers in the power domain 104-2 when the power supply 102-2 is turned off and subsequently turned on. For example, the microprocessor might require a voltage of 1.0V to operate. If the power supply 102-2 is turned off and then turn on, the voltage of the power supply 102-2 will at some point be equal to a threshold value 0.9V. When the voltage of the power supply 102-2 is equal to the threshold value, register values from registers in the power domain 104-1 are copied into the corresponding registers in the power domain 104-2, for example, using one or more specially wired circuits and level-shifters. After the voltage of the power supply 102-2 reaches 1.0V, a power OK signal for the power supply 102-2 may be generated by the power-on detector circuit for the power supply 102-2. Similarly, the voltage of the power supply 102-1 can be detected. For example, when a new battery is put in, it will still take some time, such as 10 milliseconds, for the current from the battery to charge up voltage rail due to contact bounce, limited current output from the battery, and voltage domain capacitance, etc. When the voltage rail of a battery is above a voltage threshold, such as 2.9V, a battery OK can be generated and used to synchronize the registers of the electronic timekeeping circuit 100.

In an example of an operation, the electronic timekeeping circuit 100 generates a control signal to increment the time value register 106-1 in the power supply domain 104-1 and a corresponding control signal to increment the corresponding time value register 106-2 in the power supply domain 104-2. In addition, the electronic timekeeping circuit 100 stores identical values in the registers 108-1 and 110-1 in the power supply domain 104-1 and the corresponding registers 108-2 and 110-2 in the power supply domain 104-2. For example, when the power supply 102-2 is turned off, the power-down signal of the power supply 102-2 forces control parameters stored in the control register 110-2 to be copied into the control register 110-1 if the control register 110-2 has been changed since the last power down of the power supply 102-2. If the power supply 102-2 is turned on again, the power-up signal of the power supply 102-2 causes the values stored in the time value register 106-1, the alarm value register 108-1, and the control register 110-1 in the power supply domain 104-1 to be copied into the respective registers 106-2, 108-2, 110-2 in the power supply domain 104-2. As a result, although the real-time values of the electronic timekeeping circuit 100 are originally stored in the registers 106-1, 108-1, 110-1, an external entity, such as the microprocessor 130, can read the synchronized real-time values from the registers 106-2, 108-2, 110-2.

In an embodiment, the electronic timekeeping circuit 100 is a real-time clock (RTC) circuit. A RTC circuit includes timekeeping registers, such as an alarm value register, that can be set and accessed by an external entity, such as the microprocessor 130. To allow the microprocessor to access timekeeping registers of the electronic timekeeping circuit 100, the electronic timekeeping circuit 100 may include a microprocessor interface. In an embodiment, the microprocessor interface is configured to allow a microprocessor to read one set of the timekeeping registers in the electronic timekeeping circuit 100 without accessing or disturbing another set of the timekeeping registers and to allow the microprocessor to write to all of the timekeeping registers in the electronic timekeeping circuit 100 simultaneously. In the embodiment depicted in FIG. 1, the electronic timekeeping circuit 100 includes a microprocessor bus interface 116 that is connected to the microprocessor 130. The microprocessor is not part of the electronic timekeeping circuit 100. The microprocessor accesses the electronic timekeeping circuit 100 through a peripheral bus. The electronic timekeeping circuit 100 also includes a timekeeping functional module 118 that performs basic/essential timekeeping functions such as generation of a current time value. In an embodiment, the timekeeping functional module includes an oscillator (not shown). Because the timekeeping functional module performs an essential timekeeping function of the electronic timekeeping circuit 100, power is always supplied to the timekeeping functional module. In the embodiment depicted in FIG. 1, power is supplied to the timekeeping functional module exclusively from the power supply 102-1. The timekeeping functional module and the microprocessor bus interface may be grouped into different power supply domains 104-1, 104-2. Alternatively, the timekeeping functional module and the microprocessor bus interface may be grouped into the same power supply domain 104-1 or 104-2. In addition, power can be supplied to the timekeeping functional module and the microprocessor bus interface by the same power supply or by different power supplies. In the embodiment depicted in FIG. 1, power is supplied to the timekeeping functional module by the power supply 102-1 and power is supplied to the microprocessor bus interface by the power supply 102-2.

Compared to a conventional electronic timekeeping circuit in which timekeeping registers are not duplicated, the electronic timekeeping circuit 100 uses duplicated and synchronized timekeeping registers that are distributed across the electronic timekeeping circuit 100 to store timekeeping parameters. Because the timekeeping parameters are stored in registers that are distributed across the electronic timekeeping circuit 100, an external entity such as the microprocessor 130 does not need to access the timekeeping registers where the requested timekeeping parameters were originally stored. As a result, the power consumption and accessibility issues associated with a conventional electronic timekeeping circuit are avoided. Specifically, the timekeeping registers where the requested timekeeping parameters were originally stored do not need to be frequently accessed. As a result, communications congestion, such as congestion of peripheral buses and/or bus interfaces, can be avoided and power supplied to the timekeeping registers where the requested timekeeping parameters were originally stored can be saved.

Compared to a conventional electronic timekeeping circuit with multiple power supplies and power switching circuits to switch between the power supplies, the electronic timekeeping circuit 100 does not need a power switching circuit. Power switching circuits can be complex and unreliable, which result in interruption of power to the conventional electronic timekeeping circuit. For example, when a battery supply voltage is higher than a microprocessor supply voltage in the conventional electronic timekeeping circuit, power switching circuits can be especially complex and unreliable. Because the electronic timekeeping circuit 100 can operate without a power switching circuit, the manufacturing cost of the electronic timekeeping circuit 100 can be reduced and the reliability of the electronic timekeeping circuit 100 can be improved.

Figure 2:
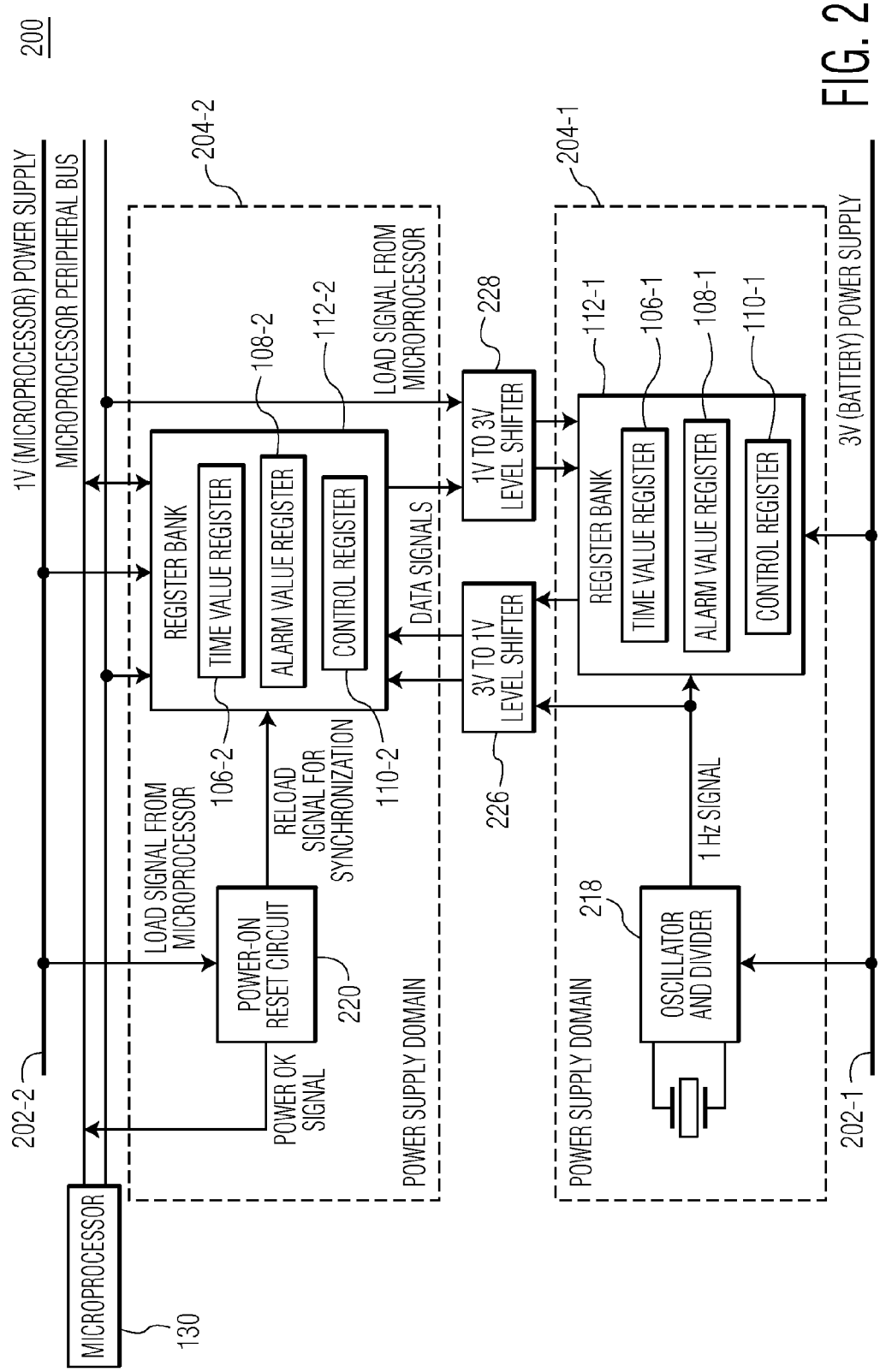
FIG. 2 depicts an embodiment of the electronic timekeeping circuit of FIG. 1 that includes a fixed voltage power supply and a battery power supply.

In some embodiments, the power supply 102-1 for the timekeeping functional module 118 is a battery or other type of power supply that can supply a limited amount of power and the power supply 102-2 is a plugged-in power supply or other type of power supply that can supply an effectively endless amount of power. For example, the power supply 102-1 may be a lithium battery or any other type of battery. Because the power supply 102-1 has a limited amount of power and the replacement of the power supply 102-1 may be difficult or sometimes impractical, the available power in the power supply 102-1 should be conserved as much as possible. If the power supply 102-1 is turned off, values stored in at least one of the registers 106-2, 108-2, 110-2 for the power supply 102-2 may be utilized and updated for continuation of operation of the electronic timekeeping circuit 100. For example, if the power supply 102-1 is turned off, the current time value stored in the time value register 106-2 may be updated and used as the current time value of the electronic timekeeping circuit 100. However, in some embodiment, parameters stored in each set of registers in the electronic timekeeping circuit 100, such as the current time value of the electronic timekeeping circuit 100, are lost if the power supply 102-1 is turned off and need to reset once the power supply 102-1 is turned on again. For example, when the power supply 102-2 is turned off, data stored the control register 110-2 will be lost and will need to be restored based on data in the control register 110-1 when the power supply 102-2 is turned on again. FIG. 2 depicts an embodiment of an electronic timekeeping circuit 200 that includes a battery power supply 202-1 and a fixed voltage power supply 202-2. The voltage of the battery power supply may decrease as power is drawn from the battery power supply while the voltage of the fixed voltage power supply may be constant and does not change over time. In the embodiment depicted in FIG. 2, the electronic timekeeping circuit 200 is a RTC circuit that includes the battery power supply 202-1 that is a 3V battery, the fixed voltage power supply 302-2 that is a power supply with a fixed voltage of 1 volt (V), a 3V to 1V level shifter 226, a 1V to 3V level shifter 228, and timekeeping components that are grouped into power supply domains 204-1, 204-2. Although the fixed voltage power supply 202-2 and the battery power supply 202-1 are shown in FIG. 2 as having voltages of 1V and 3V, respectively, in other embodiments, the fixed voltage power supply 202-2 may have a voltage that is higher than 1V or lower than 1V and the battery power supply 202-1 may have a voltage that is higher than 3V or lower than 3V.

In the embodiment depicted in FIG. 2, the fixed voltage power supply 202-2 is referred to as the 1V power supply 202-2 and the battery power supply 202-1 is referred to as the 3V battery 202-1. The power supply domain 204-1 is powered exclusively by the 3V battery while the power supply domain 204-2 is powered exclusively by the 1V power supply. The 1V power supply also powers a microprocessor 130, which is external to the electronic timekeeping circuit 200.

Timekeeping components grouped in the power supply domain 204-1 generate a current time value for the electronic timekeeping circuit 200. Specifically, timekeeping components grouped in the power supply domain 204-1 include an oscillator and divider 218 (e.g. a crystal oscillator), a time value register 106-1, an alarm value register 108-1, and a control register 110-1. The control register 110-1 is used to enable and disable the oscillator and divider, the alarm function of the electronic timekeeping circuit 200, and an interrupt of the microprocessor. Typically, timekeeping components grouped in the power supply domain 204-1 are never powered off. That is, the 3V battery is typically never turned off. To extend the battery life of the 3V battery, timekeeping components grouped in the power supply domain 204-1 should draw minimal current from the 3V battery.

The registers of the power supply domain 204-1 are duplicated in the power supply domain 204-2. In other words, the electronic timekeeping circuit 200 includes two sets of registers, which include one set of registers for each of the 3V battery 202-1 and the 1V power supply 202-2. If one set of registers loses stored values if the corresponding power supply is turned off, the other set of registers can still keep stored values if the corresponding power supply is turned on. When all of the power supplies are restored, the two sets of registers are synchronized using the level shifters 226, 228. As shown in FIG. 2, timekeeping components grouped in the power supply domain 204-2 include a power-on reset circuit 220, a time value register 106-2, an alarm value register 108-2, and a control register 110-2, that correspond to the time value register 106-1, the alarm value register 108-1, and the control register 110-1, respectively. In an embodiment, timekeeping components grouped in the power supply domain 204-2 also include a microprocessor bus interface 116 (shown in FIG. 1). In the embodiment depicted in FIG. 2, the time value register 106-1, the alarm value register 108-1, and the control register 110-1 are logically organized into a register bank 112-1 while the time value register 106-2, the alarm value register 108-2, and the control register 110-2 are logically organized into a register bank 112-2.

The power-on reset circuit 220 sends out a signal such as a short signal pulse when the 1V power supply 202-2 is turned on. The power-on signal is used to synchronize the registers 106-2, 108-2, 110-2 with the registers 106-1, 108-1, 110-1 via the 1V to 3V level shifter 228. For example, the power-on reset circuit generates a "power ok" signal to indicate that the power of the 1V power supply is adequate for running the microprocessor 130. The power ok signal can be transmitted to the register bank 112-1 via the 1V to 3V level shifter to copy data store in at least one of the registers in the register bank 112-1 to one or more corresponding registers in the register bank 112-2 via the 3V to 1V level shifter 228. The 1V power supply for the microprocessor can be switched on and off. In an embodiment, synchronization of the registers is performed whenever the power-on signal is detected, no matter whether or not the synchronization is actually being needed. It usually takes some period of time, such as 100 microseconds, for the 1V power supply to go from 0V to 1V. For example, the microprocessor requires a voltage of 1.0V to operate. If the 1V power supply is turned off and subsequently turn on, the voltage of the 1V power supply will at some point be equal to a threshold value such as 0.9V. When the voltage of the 1V power supply is equal to the threshold value, register values from registers in the power domain 204-1 are copied into the corresponding registers in the power domain 204-2 using the 1V to 3V level shifter 228. After the voltage of the 1V power supply reaches 1.0V, a power OK signal may be generated by the power-on reset circuit.

To read or write a register, the microprocessor 130 uses a subroutine (e.g. software codes) to read from or write to a register address. In an embodiment, a register address is a fixed address stored in memory such as Read-only memory (ROM) memory of the electronic timekeeping circuit 200. For example, a register address is programmed into the ROM when the electronic timekeeping circuit 200 is manufactured. For a register read, data of the register corresponding to the register address is fed to the microprocessor at the time of the read signal activation. For a register write, data comes from the microprocessor and gets put into the addressed register at the time of the write signal activation. In an embodiment, data that is already stored in the addressed register is lost during the register write. Because the electronic timekeeping circuit 200 includes two sets of registers 106-1, 108-1, 110-1 or 106-2, 108-2, 110-2 that store same information, the microprocessor only needs to read one set of registers. The microprocessor does not have to know that there are two sets of registers that store same information. In addition, the microprocessor only needs to write to one set of registers while the other set of registers is updated automatically. In an embodiment, a second set of registers is update whenever a first set of registers is written by the microprocessor. In another embodiment, after a first set of registers is written by the microprocessor, a second set of registers is only updated if the power supplied to the first set of registers is turned off. In these embodiments, the updating of the second set of registers can be done automatically. In the course of normal use, the microprocessor may be powered down periodically. In an embodiment, a power down signal is asserted to the microprocessor before the 1V power supply 202-2 is turned off. Upon subsequent powering up, the 1V power supply is turned on and a power-up signal is asserted to the microprocessor. In an embodiment, the oscillator and divider 218 generates a 1 Hz signal that is used to increment the time value register 106-1 in the power supply domain 204-1. This 1 Hz signal is level-shifted to the power supply domain 204-2 to increment the corresponding time value register 106-2 via the 3V to 1V level shifter 226 when the 1V power supply 202-2 is turned on. The microprocessor 130 can write to the time value registers 106-1, 106-2 and the alarm value registers 108-1, 108-2 to set new values. When the 1V power supply is on, the duplicated time value and alarm value registers 106-2 and 108-2 contain the same values as the corresponding registers 106-1 and 108-1. When the microprocessor needs data stored in the time value registers and the alarm value registers 106-1, 106-2, 108-1, 108-2, the microprocessor only needs to read from the duplicated registers 106-2 and 108-2 in the power supply domain 204-2. In conventional electronic timekeeping circuits, timekeeping registers usually are not duplicated. As a result, when a microprocessor needs to use the parameters stored in the timekeeping registers, the microprocessor has to access these timekeeping registers. However, power consumption and accessibility issues arise when timekeeping registers are frequently accessed. Because the microprocessor only needs to read from the duplicated registers 106-2 and 108-2, the power consumption and accessibility issues associated with a conventional electronic timekeeping circuit are avoided in the electronic timekeeping circuit 200.

The 1V power supply 202-2, which may be an alternating current (AC) power adapter, can be switched on and off. The 3V battery 202-1 is never turned off. As soon as the 3V battery is put in, circuits supplied by the 3V battery such as the oscillator and divider 218 and the registers 106-1, 108-1, 110-1 will be turned on, after a short turn-on time such as 10 milliseconds. The circuits supplied by the 3V battery will keep running until the 3V battery dies or is replaced. For example, if the electronic timekeeping circuit 200 is used in a digital thermostat of a furnace, the digital thermostat will immediately start up and be ready for programming after a battery is installed. Once the digital thermostat is programmed, the thermostat settings are saved in the battery operated timer as long as the battery is not dead or replaced. If the battery is removed, the thermostat settings saved in the battery operated timer are lost and the digital thermostat needs to be reprogrammed.

When the 1V power supply 202-2 is turned off, timekeeping components grouped in the power supply domain 204-1 of the electronic timekeeping circuit 200 may be still in operation (i.e., powered up) if the 3V battery is turned on. In an embodiment, the power-down signal of the 1V power supply forces control parameters stored in the control register 110-2 to be copied into the control register 110-1 via the 1V to 3V level shifter 228 if the control register 110-2 has been changed since the last power down of the 1V power supply. If the 1V power supply is turned off, the microprocessor 130 will not respond to any interrupt. As a result, there is no need for any interrupt or time signal to be level-shifted to the power supply domain 204-2. If the 1V power supply is turned on again, the power-up signal will cause the values stored in the time value register 106-1, the alarm value register 108-1, and the control register 110-1 in the power supply domain 204-1 to be copied into the respective registers 106-2, 108-2, 110-2 in the power supply domain 204-2 via the 3V to 1V level shifter 226. As a result, although the real-time values of the electronic timekeeping circuit 200 are originally generated by the oscillator and divider 218 and stored in the registers 106-1, 108-1, 110-1, the microprocessor can read the synchronized real-time values from the registers 106-2, 108-2, 110-2.

Figure 3:
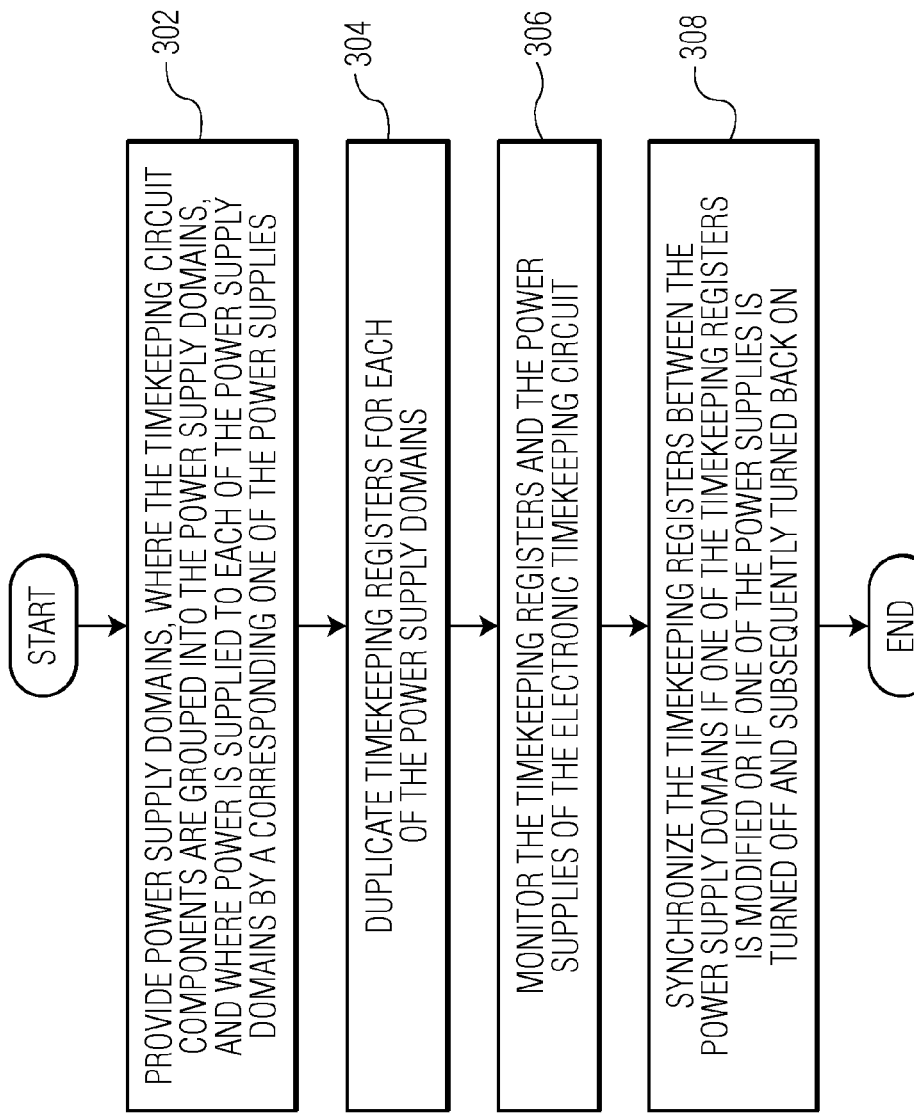
FIG. 3 is a process flow diagram of a method for operating an electronic timekeeping circuit in accordance with an embodiment of the invention.

FIG. 3 is a process flow diagram of a method for operating an electronic timekeeping circuit in accordance with an embodiment of the invention. The electronic timekeeping circuit includes power supplies and timekeeping circuit components. The electronic timekeeping circuit may be similar to or the same as the electronic timekeeping circuit 100 or 200. At block 302, power supply domains are provided, where the timekeeping circuit components are grouped into the power supply domains, and where power is supplied to each of the power supply domains by a corresponding one of the power supplies. At block 304, timekeeping registers are duplicated for each of the power supply domains. At block 306, the timekeeping registers and the power supplies of the electronic timekeeping circuit are monitored. At block 308, the timekeeping registers are synchronized between the power supply domains if one of the timekeeping registers is modified or if one of the power supplies is turned off and subsequently turned back on.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. An electronic timekeeping circuit comprising:
a plurality of power supplies; and
timekeeping circuit components that are grouped into a plurality of power supply domains, wherein power is supplied to each of the power supply domains exclusively by a corresponding one of the power supplies, wherein timekeeping registers are duplicated for each of the power supply domains, wherein a power-on signal is generated after an alternating current (AC) power supply for a first power supply domain is turned on and transmitted to timekeeping registers in a second power supply domain via a first level shifter to copy data stored in the timekeeping registers in the second power supply domain to timekeeping registers in the first power supply domain via a second level shifter, and wherein the timekeeping registers are synchronized between the power supply domains if one of the timekeeping registers is modified and a power supply that supplies power to the one of the timekeeping registers is turned off such that the timekeeping registers store same information.

2. The electronic timekeeping circuit of claim 1, wherein timekeeping circuit components that are grouped into each of the power supply domains comprise a corresponding set of timekeeping registers.

3. The electronic timekeeping circuit of claim 1, wherein the timekeeping circuit components that are grouped into the second power supply domain perform a timekeeping function of the electronic timekeeping circuit.

4. The electronic timekeeping circuit of claim 3, wherein timekeeping circuit components in the first power supply domain comprise a microprocessor interface configured to:
allow a microprocessor to read one set of the timekeeping registers in the electronic timekeeping circuit without disturbing another set of the timekeeping registers; and
allow the microprocessor to write to all of the timekeeping registers in the electronic timekeeping circuit simultaneously.

5. The electronic timekeeping circuit of claim 3, wherein the timekeeping circuit components that are grouped into the second power supply domain comprise an oscillator.

6. The electronic timekeeping circuit of claim 3, wherein power is supplied to the second power supply domain by a battery.

7. The electronic timekeeping circuit of claim 1, wherein logical signals are used to indicate whether or not power supply voltages of the power supplies are valid, and wherein the timekeeping registers are synchronized if one of the power supply voltages becomes invalid as indicated by the logical signals.

8. The electronic timekeeping circuit of claim 1, wherein timekeeping circuit components in one of the power supply domains comprise a microprocessor interface configured to:
allow a microprocessor to read one set of the timekeeping registers in the electronic timekeeping circuit without accessing another set of the timekeeping registers; and
allow the microprocessor to write to all of the timekeeping registers in the electronic timekeeping circuit simultaneously.

9. The electronic timekeeping circuit of claim 1, wherein timekeeping circuit components in one of the power supply domains comprise a microprocessor interface configured to:
allow a microprocessor to read one set of the timekeeping registers in a first one of the power supply domains without accessing another set of the timekeeping registers in a second one of the power supply domains; and
allow the microprocessor to write to all of the timekeeping registers in the electronic timekeeping circuit simultaneously.

10. The electronic timekeeping circuit of claim 1, wherein the electronic timekeeping circuit is a real-time clock (RTC) circuit.

11. The electronic timekeeping circuit of claim 1, wherein timekeeping circuit components that are grouped into each of the power supply domains comprise a time value register configured to store a current time value that is generated by the electronic timekeeping circuit, an alarm value register configured to store an alarm value of the electronic timekeeping circuit, and a control register configured to store a control parameter.

12. The electronic timekeeping circuit of claim 1, wherein power is not drawn from a power supply of the second power supply domain to the AC power supply.

13. An electronic timekeeping circuit comprising:
an alternating current (AC) first power supply;
a second power supply; and
timekeeping circuit components that are grouped into a first power supply domain and a second power supply domain, wherein power is supplied to the first power supply domain exclusively by the AC first power supply, wherein power is supplied to the second power supply domain exclusively by the second power supply, wherein timekeeping registers are duplicated for each of the first and second power supply domains, wherein a power-on signal is generated after the AC first power supply is turned on and transmitted to timekeeping registers in the second power supply domain via a first level shifter to copy data stored in the timekeeping registers in the second power supply domain to timekeeping registers in the first power supply domain via a second level shifter, and wherein the timekeeping registers are synchronized between the first and second power supply domains if one of the timekeeping registers is modified and a power supply that supplies power to the one of the timekeeping registers is turned off such that the timekeeping registers store same information.

14. The electronic timekeeping circuit of claim 13, wherein timekeeping circuit components that are grouped into each of the first and second power supply domains comprise a corresponding set of timekeeping registers.

15. The electronic timekeeping circuit of claim 14, wherein the timekeeping circuit components that are grouped into each of the first power supply domain and the second power supply domain comprise a time value register configured to store a current time value that is generated by the electronic timekeeping circuit, an alarm value register configured to store an alarm value of the electronic timekeeping circuit, and a control register configured to store a control parameter, wherein the timekeeping circuit components that are grouped into the second power supply domain further comprise an oscillator configured to generate the current time value, and wherein the timekeeping circuit components that are grouped into the first power supply domain further comprise a microprocessor interface configured to:
allow a microprocessor to read the set of the timekeeping registers in one of the first and second power supply domains without accessing the set of the timekeeping registers in another one of the first and second power supply domains; and allow the microprocessor to write to all of the timekeeping registers in the electronic timekeeping circuit simultaneously.

16. The electronic timekeeping circuit of claim 13, wherein the second power supply includes a battery and the AC first power supply includes an AC power adapter.

17. A method for operating an electronic timekeeping circuit comprising a plurality of power supplies and timekeeping circuit components, the method comprising:
providing a plurality of power supply domains, wherein the timekeeping circuit components are grouped into the power supply domains, and wherein power is supplied to each of the power supply domains exclusively by a corresponding one of the power supplies;
duplicating timekeeping registers for each of the power supply domains;
monitoring the timekeeping registers and the power supplies of the electronic timekeeping circuit; and
generating a power-on signal after an alternating current (AC) power supply for a first power supply domain is turned on and transmitting the power-on signal to timekeeping registers in a second power supply domain via a first level shifter to copy data stored in the timekeeping registers in the second power supply domain to timekeeping registers in the first power supply domain via a second level shifter; and
synchronizing the timekeeping registers between the power supply domains if one of the timekeeping registers is modified and a power supply that supplies power to the one of the timekeeping registers is turned off such that the timekeeping registers store same information.

18. The method of claim 17, wherein timekeeping circuit components that are grouped into each of the power supply domains comprise a corresponding set of timekeeping registers.

19. The method of claim 17, wherein the timekeeping circuit components that are grouped into the second power supply domain perform a timekeeping function of the electronic timekeeping circuit, and wherein power is supplied to the second power supply domain by a battery.

20. The method of claim 17 further comprising:
allowing a microprocessor to read one set of the timekeeping registers in the electronic timekeeping circuit without accessing another set of the timekeeping registers; and
allowing the microprocessor to write to all of the timekeeping registers in the electronic timekeeping circuit simultaneously.

* * * * *